(12) United States Patent
Youker et al.

(10) Patent No.: US 7,344,800 B2
(45) Date of Patent: Mar. 18, 2008

(54) BATTERY DESIGN FOR IMPLANTABLE MEDICAL DEVICES

(75) Inventors: Nick A. Youker, River Falls, WI (US); John E. Hansen, Coon Rapids, MN (US); Lawrence D. Swanson, Lino Lakes, MN (US); David Chizek, Fridley, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 600 days.

(21) Appl. No.: 10/858,831

(22) Filed: Jun. 2, 2004

(65) Prior Publication Data

US 2005/0271937 A1    Dec. 8, 2005

(51) Int. Cl.
*H01M 2/36* (2006.01)
*H01M 2/06* (2006.01)

(52) U.S. Cl. .................. 429/72; 429/161; 429/181; 29/623.2; 29/623.4

(58) Field of Classification Search .............. 429/72, 429/161, 181, 184; 29/623.2, 623.4, 623.5
See application file for complete search history.

(56) References Cited

U.S. PATENT DOCUMENTS

| 5,741,313 | A | 4/1998 | Davis et al. |
| 6,475,680 | B1 * | 11/2002 | Arai et al. ................. 429/340 |
| 6,586,134 | B2 | 7/2003 | Skoumpris |
| 6,610,443 | B2 * | 8/2003 | Paulot et al. .............. 429/181 |
| 2002/0012829 | A1 * | 1/2002 | Yamahira et al. ......... 429/72 X |
| 2004/0127952 | A1 | 7/2004 | O'Phelan et al. |
| 2005/0261543 | A1 | 11/2005 | Abe et al. |
| 2006/0247688 | A1 | 11/2006 | Olson et al. |

* cited by examiner

*Primary Examiner*—Stephen J. Kalafut
(74) *Attorney, Agent, or Firm*—Schwegman, Lundberg & Woessner, P.A.

(57) ABSTRACT

An improved battery design which is particularly suitable for use in an implantable medical device is disclosed. The design utilizes a two-part case for the battery contents which allows freedom with respect to feedthrough locations and battery shape.

18 Claims, 2 Drawing Sheets

BATTERY DESIGN FOR IMPLANTABLE MEDICAL DEVICES

FIELD OF THE INVENTION

This invention pertains to battery-powered implantable medical devices and methods for their construction.

BACKGROUND

Implantable medical devices are now in wide use for treating a variety of diseases. Cardiac rhythm management devices, for example, are implantable devices that provide electrical stimulation to the heart in order to treat disorders of cardiac rhythm. A pacemaker, for example, is a cardiac rhythm management device that paces the heart with timed pacing pulses, while an implantable cardioverter/defibrillator (ICD) is a device that provides defibrillation shock therapy to the heart. It is also common for cardiac rhythm management devices to combine both of these functions. These devices are usually implanted into the chest or abdominal wall with electrode leads connected to the device then passed transvenously into the heart. It is desirable for an implanted device to be as compact and physiologically-shaped as possible so as to minimize discomfort to the patient. Cardiac rhythm management devices, as well as other types of implantable medical devices, are powered by a battery contained within the housing of the device. The size and shape of a battery which supplies sufficient power to operate the device is one factor which affects how small and physiologically-shaped the housing of the device can be made. The present disclosure relates to a battery and method for its construction which is suitable for use in an implantable medical device and which affords a designer greater degrees of freedom in packaging the device components into a housing than can be obtained with previous batteries.

DETAILED DESCRIPTION

Figure 1:
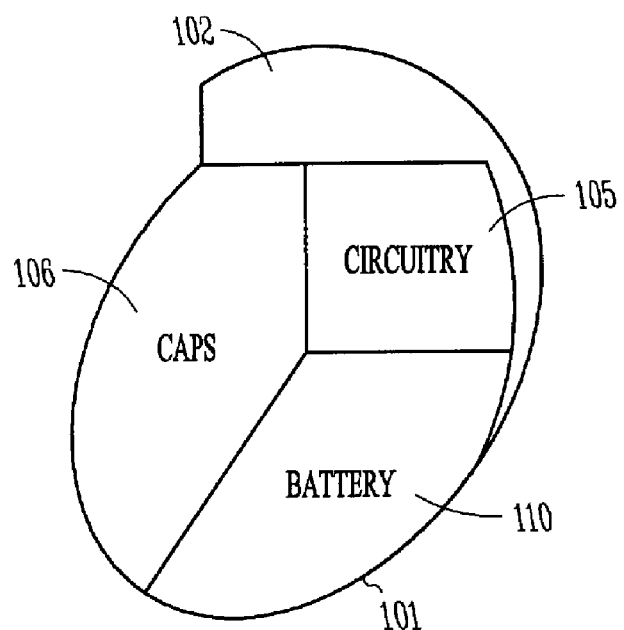
FIG. 1 depicts the layout of an implantable cardiac rhythm management device.

FIG. 1 shows a typical layout of an implantable cardiac rhythm management device. The housing 101 is usually made of titanium or other biocompatible metal and contains the electronic components necessary for sensing cardiac activity and delivering electrostimulation to the heart. These components include sensing and therapy circuitry 105, capacitors 106, and a battery 110. One or more leads with electrodes for disposition near the heart are connected to the sensing and therapy circuitry contained within the housing by means of a header 102 which has feedthroughs located therein for routing the leads to the appropriate internal components. As can be seen from the figure, the battery occupies a large portion of the space within the device housing. The physical structure of the battery therefore greatly constrains a device designer in attempting to produce a physiologically shaped housing that is still able to contain the components necessary for providing desired functionalities to the device.

Figure 2A:
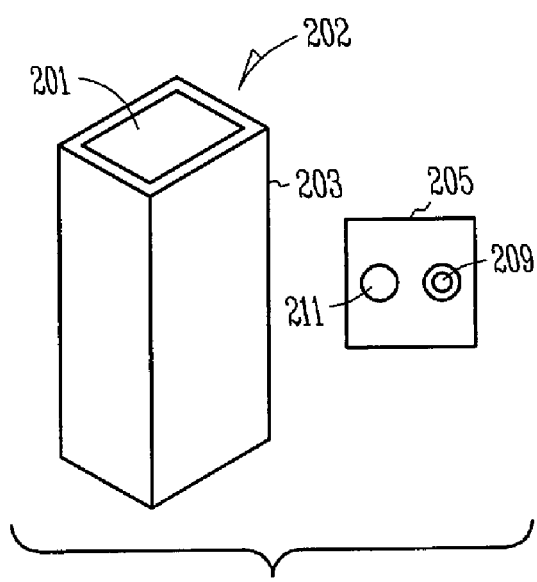
FIGS. 2A and 2B depict a prior art battery design.
Figure 2B:
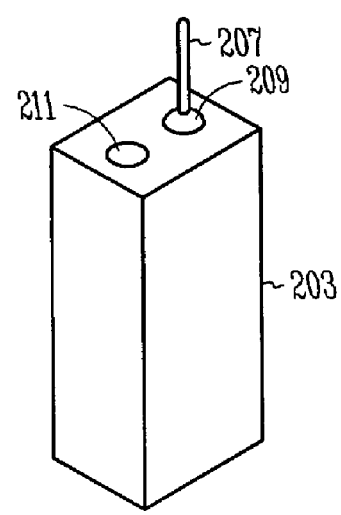

Many batteries used for cardiac rhythm management devices at the present time are lithium cells which use lithium as the anode. Many different lithium cell designs exist which employ a number of different cathodes and electrolytes. A lithium cell commonly used in pacemakers, for example, is a lithium-iodine cell which uses a complex of iodine and poly-2-vinyl pyridine (P2PVP) as both the cathode and electrolyte. In this type of battery, a central cell structure made of lithium and coated with polyvinyl pyridine (PVP) is disposed within a case and surrounded by the electrolyte except where a feedthrough pin interconnects with the central structure. Batteries which use different chemistries, including those which use a material other than lithium as the anode, may be similarly constructed. The feedthrough pin exits the case through a feedthrough assembly which both seals the case and electrically insulates the feedthrough pin from the case. The feedthrough pin thus serves as the anode terminal for the battery, while the conductive case in contact with the electrolyte serves as the cathode terminal. With other battery chemistries, the central cell structure may form both the anode and cathode, and the feedthrough pin may interconnect with either the anode or cathode of the central cell structure. FIGS. 2A and 2B illustrate a conventional method of constructing a battery such as just described. FIG. 2A shows central cell structure 201 disposed within a case 203, typically made of stainless steel or titanium, after being inserted through the opening 202. A feedthrough plate 205 is welded to the case to seal the opening. A feedthrough pin 207 is interconnected with the central cell structure and exits the case through a feedthrough assembly 209 located in the feedthrough plate. Electrolyte is then inserted or injected into the case through an electrolyte fill hole 211 in the feedthrough plate up to a level referred to as the electrolyte fill zone such that the electrolyte solidifies around the central cell structure except at the feedthrough pin interconnect points. The electrolyte fill hole is welded closed to form the completed cell as shown in FIG. 2B.

For batteries constructed as described above, it should be apparent that the space above the electrolyte fill zone to the top of the feedthrough plate does not contribute to battery function and hence is wasted. The volume of this wasted space is proportional to the size of the case opening through which the central cell structure is inserted and which is covered by the feedthrough plate. Optimal cell efficiency, in terms of performance per cubic centimeter, thus occurs with cells that minimize the size of the case opening with respect to the volume of the case. For this reason, prior art construction techniques have generally employed metallic cases formed by a deep drawing process which leave a relatively small opening to be covered by the feedthrough plate. This may result, for example, in cells that are tall and geometrically rectangular. As the ratio between cell height and cell width increases, the cell becomes more volumetric efficient in terms of total power output per unit volume, and deviating from the optimal ratio results in cell performance penalties. This prior art construction technique constrains the mechanical designer tremendously, as only cell geometries that are capable of being deep drawn and assembled can be considered. Additionally, significant design decision tradeoffs are made to either volumetrically optimize cell performance using conventional cell construction, which minimizes wasted space above the electrolyte fill zone to the top of the feedthrough cover, versus decreasing cell efficiency dramatically by deviating from this volumetrically optimized cell construction. This approach results in very limited opportunities for total battery volume optimization and miniaturization which compromises the goal of providing an implantable device that is small and physiologically shaped.

Presented herein is an improved battery design and method for its construction which overcomes the problems described above and which may be used with any type of battery chemistry. Such a battery utilizes a case which includes two case portions. The two-part case allows significant design degrees of freedom in battery shape, battery output efficiency, battery feedthrough locations, and, consequently, implantable device shape and volume efficiency. A central cell structure is disposed into a first case portion, where the central cell structure functions according to the particular battery chemistry employed. A feedthrough pin is interconnected with an anode or cathode of the central cell structure. The feedthrough pin exits the first case portion via a feedthrough assembly located within a wall of the first case portion. A second case portion is then welded to the first case portion to form a case containing the internal cell structure. An electrolyte is filled into the case through an electrolyte fill hole, wherein the electrolyte electrically connects the case to an anode or cathode of the battery. The filling is performed such that the electrolyte solidifies within the case up to the top of an electrolyte fill zone without making electrical contact with the feedthrough pin or its interconnections with the central cell structure. The electrolyte fill hole is then welded closed. In various embodiments, the electrolyte fill hole may be located in a wall of the first case portion, a wall of the second case portion, or formed by both the first and second case portions. The electrolyte fill hole may be located adjacent to the feedthrough assembly or elsewhere. In order to further minimize the wasted space above the electrolyte fill zone, the electrolyte fill hole and feedthrough assembly may be located in a protruding wall of the completed case.

Figure 3A:
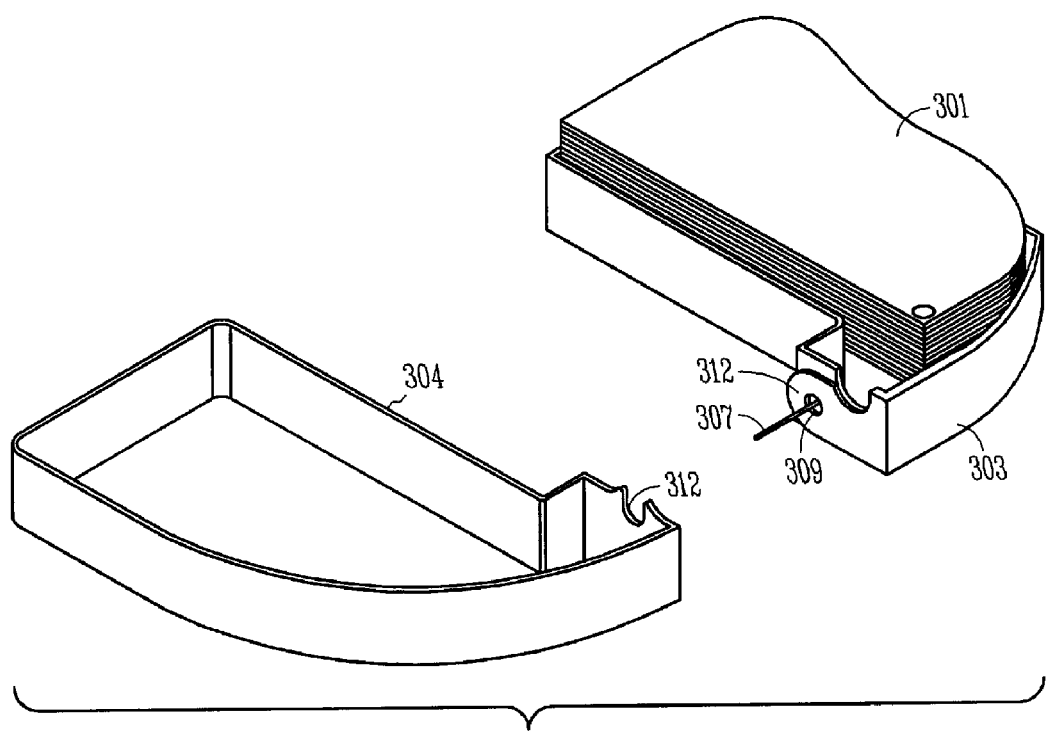
FIGS. 3A and 3B depict an improved battery design.
Figure 3B:
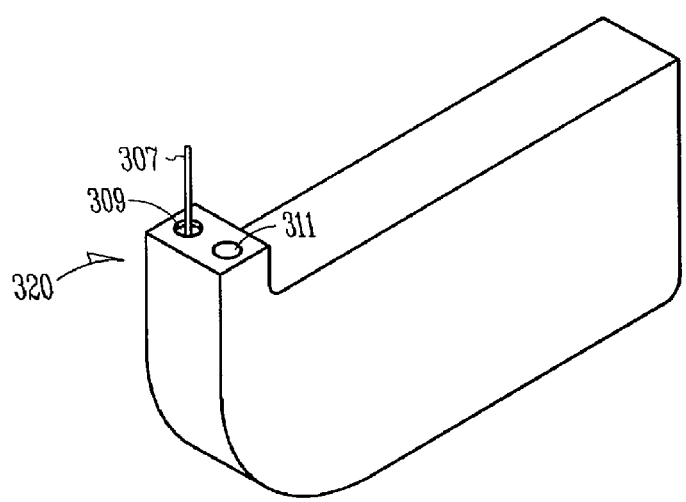

FIGS. 3A and 3B illustrate an exemplary embodiment where the first and second case portions are approximately symmetrical halves of the case. The case is ellipsoid in shape to thus form a clam-shell type of case. FIG. 3A shows central cell structure 301 disposed within a first case portion 303. A feedthrough pin 307 is interconnected with the central cell structure and exits the case through a feedthrough assembly 309 located in wall of the first case portion. The second case portion 304 is then welded to the second case portion 303 to form the case containing the central cell structure. Electrolyte is poured into the case through an electrolyte fill hole 311 up to the electrolyte fill zone such that the electrolyte solidifies around the central cell structure except at the feedthrough pin and its interconnect points. In this embodiment, the electrolyte fill hole 311 is formed by separate notches 312 in the first and second case portions when the two case halves are welded together. (In other embodiments, the electrolyte fill hole may be located in or the other of the case portions.) The feedthrough assembly 309 and fill hole 311 are both located in a protruding portion 320 of the case in order to reduce the volume of the space above the electrolyte fill zone. The electrolyte fill hole is welded closed to form the completed cell as shown in FIG. 3B. This improved battery design allows significant latitude in the physical location of the required electrically isolated feedthrough conduit required to make the electrical connection with the remainder of electronic circuitry in the implantable device. Prior art designs necessitated that the feedthrough location be in a separate feedthrough plate due to constraints placed on feedthrough access after the cell contents are placed into the deep drawn cell container. The present design, on the other hand, allows for virtually all the necessary cell component assembly operations to be performed in one of the case halves, the feedthrough interconnects completed, and then assembly of the remaining case half. The physical location of the required feedthrough interconnect is capable of being located virtually anywhere on the entire perimeter of the cell rather than a specific location as with prior art designs.

In prior art battery designs, only geometries that are capable of being deep drawn could be considered as viable. The improved battery design presented herein offers possibilities which are not constrained by deep drawing geometries and makes it technically possible to construct cosmetically elegant cells without the prior art efficiency losses in cell performance. By employing these improved construction techniques, the packaging designer is allowed degrees of freedom in battery geometries not realized in prior art designs and can effectively satisfy the needs for overall device size reduction while maintaining battery volumetric efficiency. This allows the designer to concentrate on the implantable device form factor independent of battery volumetric efficiency tradeoffs.

Although the invention has been described in conjunction with the foregoing specific embodiment, many alternatives, variations, and modifications will be apparent to those of ordinary skill in the art. Such alternatives, variations, and modifications are intended to fall within the scope of the following appended claims.

What is claimed is:

1. A method for constructing a battery, comprising:
disposing a central cell structure into a first case portion;
interconnecting an anode or cathode of the internal cell structure with a feedthrough pin which exits the first case portion via a feedthrough assembly located within a wall of the first case portion;
welding a second case portion to the first case portion to form a case containing the central cell structure; and,
filling the case with an electrolyte through an electrolyte fill hole of the case, wherein the electrolyte electrically connects the case with an anode or cathode of the battery, and wherein the filling is performed such that the electrolyte solidifies within the case without making contact with the feedthrough pin.

2. The method of claim 1 wherein the electrolyte fill hole is located in a wall of the first case portion.

3. The method of claim 1 wherein the electrolyte fill hole is located in a wall of the second case portion.

4. The method of claim 1 wherein the electrolyte fill hole is formed by both the first and second case portions.

5. The method of claim 1 wherein the electrolyte fill hole is located adjacent to the feedthrough assembly.

6. The method of claim 1 wherein the electrolyte fill hole and feedthrough assembly are located in a protruding wall of the completed case.

7. The method of claim 1 wherein the first and second case portions are approximately symmetrical halves of the completed case.

8. The method of claim 1 wherein the feedthrough assembly is located adjacent where the first and second case portions are welded together.

9. The method of claim 8 wherein the first and second case portions are approximately symmetrical halves of the completed case.

10. The method of claim 9 wherein the electrolyte fill hole and feedthrough assembly are located in a protruding wall of the completed case.

11. A battery, comprising:
a central cell structure disposed into a first case portion;
a feedthrough pin which exits the first case portion via a feedthrough assembly located within a wall of the first case portion, wherein the feedthrough pin is interconnected with an anode or cathode of the central cell structure;

a second case portion welded to the first case portion to form a case containing the internal cell structure, wherein the case has a protruding wall, wherein the electrolyte fill hole and feedthrough assembly are located in the protruding wall, and wherein no portion of the central cell structure is within the volume enclosed by the protruding wall; and, an electrolyte filled into the case through an electrolyte fill hole, wherein the electrolyte electrically connects the case to an anode or cathode of the battery, and wherein the filling is performed such that the electrolyte solidifies within the case without making contact with the feedthrough pin.

12. The battery of claim 11 wherein the electrolyte fill hole is located in a wall of the first case portion.

13. The battery of claim 11 wherein the electrolyte fill hole is located in a wall of the second case portion.

14. The battery of claim 11 wherein the electrolyte fill hole is formed by both the first and second case portions.

15. The battery of claim 11 wherein the electrolyte fill hole is located adjacent to the feedthrough assembly.

16. The battery of claim 11 wherein the first and second case portions are approximately symmetrical halves of the completed case.

17. The battery of claim 11 wherein the feedthrough assembly is located adjacent where the first and second case portions are welded together.

18. The battery of claim 17 wherein the first and second case portions are approximately symmetrical halves of the completed case.

* * * * *